Figure 1:
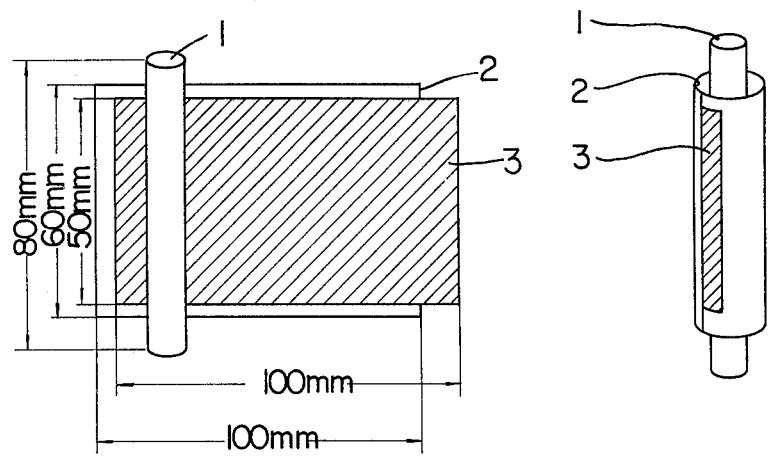

United States Patent [19]

Omori et al.

[11] 4,094,835

[45] June 13, 1978

[54] UNSATURATED POLYESTER RESINOUS COMPOSITION

[75] Inventors: Eiji Omori; Yuuji Aimono; Yoshiyuki Mukoyama; Hatuo Sugitani, all of Hitachi, Japan

[73] Assignee: Hitachi Chemical Company, Ltd., Japan

[21] Appl. No.: 762,266

[22] Filed: Jan. 25, 1977

[30] Foreign Application Priority Data

Jan. 28, 1976 Japan .................................. 51-8811
Jul. 30, 1976 Japan .................................. 51-91947

[51] Int. Cl.² ........................ C09D 3/66; C09D 5/25
[52] U.S. Cl. ................... 260/22 CB; 260/22 A; 260/22 CA; 260/861; 260/862; 260/863; 260/864
[58] Field of Search ........... 260/22 CB, 22 CA, 22 A, 260/861, 863, 864, 862

[56] References Cited

U.S. PATENT DOCUMENTS

| | | | |
|---|---|---|---|
| 2,773,049 | 12/1956 | Cowee | 260/863 |
| 3,356,641 | 12/1967 | Roedel et al. | 260/22 CA |
| 3,535,404 | 10/1970 | Barie et al. | 260/861 |
| 3,594,439 | 7/1971 | Baker | 260/863 |
| 3,829,532 | 8/1974 | Meloy et al. | 260/864 |
| 3,859,235 | 1/1975 | Vargiu et al. | 260/22 CB |
| 3,920,590 | 11/1975 | Jacobs et al. | 260/863 |

OTHER PUBLICATIONS

Chemical Abstracts, vol. 71, No. 10, Sep. 8, 1969, p. 44750q.
Chemical Abstracts, vol. 71, Jul.–Dec. 1969, Subj. Index J–Z, PT3, pp. 3,565s and 3,566s.
Chemical Abstracts, vol. 82, No. 18, May 5, 1975, p. 115138m.

*Primary Examiner*—Ronald W. Griffin
*Attorney, Agent, or Firm*—Craig & Antonelli

[57] ABSTRACT

An unsaturated polyester resinous composition comprising (a) unsaturated polyester, (b) a crosslinkable monomer, (c) at least one compound selected from the group consisting of 1,2,4-triazole and its derivatives, (d) a curing agent and (e) a manganese salt of organic acid as a curing accelerator is excellent in the adhesion to copper, the prevention of patina, air drying characteristics and stability of varnish.

5 Claims, 3 Drawing Figures

UNSATURATED POLYESTER RESINOUS COMPOSITION

This invention relates to an unsaturated polyester resinous composition characterized by containing at least one 1,2,4-triazole and its derivatives and a manganese salt of organic acid in order to increase adhesive strength to copper to prevent patina to be generated on contact surfaces on copper, and to improve air drying characteristics.

Unsaturated polyester resinous compositions are excellent in economical efficiency, processability and physical properties, so that they are used in various fields such as molding materials, fiberglass-reinforced plastics, electric insulators and the like.

But, if an unsaturated polyester resinous composition is used for electric insulation, for example, in rotary machines such as a motor, there are imposed stresses such as vibration and centrifugal force, and if used in a power transformer, there is effected electromagnetic force among coil lines and among mutual cores at a time of load, which result in, after the use of a long period, wear in enameled copper wires and cause short circuits between layers. Further, it is necessary to bond each parts strongly in order to prevent noise when used in a short period. Thus to increase adhesive strength of the unsaturated polyester resinous composition is desirable.

In addition, there has been a problem in conventional unsaturated polyester resinous compositions particularly used as an electric insulator, since patina has been generated on contact surfaces on copper at a time of curing. In order to prevent the generation of patina (green rust), it has been known that oxalic acid and malonic acid are effective. But the use of oxalic acid, for example, was limited, since oxalic acid easily forms a complex with a metal such as cobalt, manganese, nickel, iron, lead, lithium or the like which is generally used as a curing accelerator (hereinafter referred to as "accelerator") for an unsaturated polyester resinous composition and produces precipitate at room temperature in a short time.

The present inventors found that if at least one compound selected from the group consisting of 1,2,4-triazole and its derivatives was used in place of oxalic acid, the problem of producing precipitate could be solved.

Further, if at least one compound selected from the group consisting of 1,2,4-triazole and its derivatives is used in an unsaturated polyester resinous composition, stability of a varnish can be improved but air drying characteristics become deteriorated remarkably if a salt of metal such as cobalt, lithium, lead, nickel, iron or the like which is conventionally used is used as an accelerator.

The present inventors have studied extensively and found that if a manganese salt of organic acid is added as an accelerator to an unsaturated polyester resinous composition containing at least one compound selected from the group consisting of 1,2,4-triazole and its derivatives, air drying characteristics, stability of a varnish and adhesion to copper can be improved remarkably and patina of copper can be prevented effectively.

The present invention provides an unsaturated polyester resinous composition comprising (a) unsaturated polyester, (b) at least one crosslinkable monomer, (c) at least one compound selected from the group consisting of 1,2,4-triazole and its derivatives, (d) a curing agent, and (e) a manganese salt of organic acid as a curing accelerator.

The composition of this invention is suitable for use for casting, impregnation and a trickle method, and particularly suitable for preparing a varnish for electric insulation. It can also be used as fiberglass-reinforced plastics (FRP), laminated sheets, molding materials, and the like, in which it is used in contact with copper.

More in detail, the composition of the present invention comprises (a) 80 to 30% by weight, preferably 70 to 50% by weight of unsaturated polyester, (b) 20 to 70% by weight, preferably 30 to 50% by weight of at least one crosslinkable monomer, (c) 0.000012 to 0.036 mole, preferably 0.00012 to 0.024 mole of at least one compound selected from the group consisting of 1,2,4-triazole and its derivatives per 100 g of the components (a) and (b), (d) 0.5 to 3.0 g, preferably 1.0 to 2.0 g of a curing agent per 100 g of the components (a) and (b), and (e) 0.001 to 1.5 g, preferably 0.005 to 0.05 g of a manganese salt of organic acid in terms of the weight of the metal per 100 g of the components (a) and (b).

As the unsaturated polyester, that generally used resin can be used. For example, the unsaturated polyester can be obtained by polycondensing polyalcohol components and polycarboxylic acid components containing 20 - 80% by mole of unsaturated carboxylic acids. At the polycondensation reaction, monocarboxylic acids such as fatty acids and modifying components may be included in the reaction system as reactants. Preferable molecular weight of the unsaturated polyester is about 500 to 3000. As the polyalcohol components, ethylene glycol, propylene glycol, diethylene glycol, dipropylene glycol, neopentyl glycol and their derivatives or their mixtures may be used. As the polycarboxylic acid components, there may be used unsaturated polycarboxylic acids such as maleic acid, fumaric acid, itaconic acid, citraconic acid, endomethylenetetrahydrophthalic acid, methylendomethylenetetrahydrophthalic acid, tetrahydrophthalic acid, methyltetrahydrophthalic acid, and the like and anhydrides of these acids; saturated polycarboxylic acids such as phthalic acid, isophthalic acid, terephthalic acid, adipic acid, and the like and anhydrides of these acids; monocarboxylic acids such as fatty acids obtained from vegetable oils, e.g. linseed oil, soya oil, tall oil, coconut oil, castor oil, and the like. As the modifying components, there may be used dicyclopentadiene, cyclopentadiene, and the like.

As the crosslinkable monomers, there may be used styrene, vinyl toluene, α-methyl styrene, t-butyl styrene, chlorostyrene, divinylbenzene, diallyl phthalate, diallyl isophthalate, various esters of acrylic acid, various esters of methacrylic acid, and the like.

As 1,2,4-triazole and its derivatives, there may be used compounds having the formula,

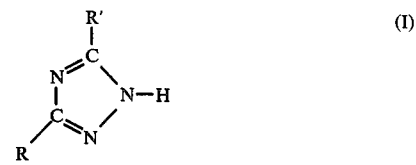

wherein R and R' are independently hydrogen, amino, or a group of the formula,

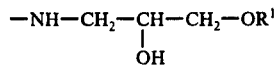

or

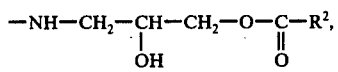

wherein $R^1$ is an alkyl group having 4 to 8 carbon atoms, e.g. butyl to octyl; or an aryl group such as phenyl, halogen substituted phenyl, cresyl, halogen substituted cresyl, and the like; $R^2$ is an alkyl group having 8 to 10 carbon atoms.

As the curing agents which may be added at a time of curing, there may be used acyl peroxides such as benzoyl peroxide, acetyl peroxide, etc.; t-butyl peroxide; cumene hydroperoxide; ketone peroxides such as methyl ethyl ketone peroxide, cyclohexanone peroxide, etc.; dialkyl peroxides such as dicumyl peroxide, etc.; oxyperoxides such as t-butyl perbenzoate, t-butyl peroxyacetate, etc.

As the manganese salts of organic acids, there may be used manganese naphthenate, manganese octoate, and the like.

If required, there may be used polymerization inhibitors such as quinones, e.g. hydroquinone, p-t-butyl catechol, pyrogallol, and other conventionally used ones.

The invention is illustrated more particularly by way of the following examples in which parts are by weight.

EXAMPLE 1

15 Parts of soya oil fatty acid, 45 parts of maleic anhydride, 40 parts of isophthalic acid, 52 parts of propylene glycol, and 52 parts of dipropylene glycol were condensed with heating at 200° – 220° C for 5 to 8 hours to give a resin having an acid value of 20.5. To 60 parts of the resin, 40 parts of styrene was dissolved with heating to give unsaturated polyester resinous composition (I). To 100 parts of the composition (I), 0.2 part of 1,2,4-triazole, 0.2 part of manganese naphthenate (the metal content 8%), and 1.0 part of benzoyl peroxide were added and mixed with stirring to give Varnish H.

EXAMPLE 2

100 Parts of the composition (I) obtained in Example 1, 0.2 part of 3-amino-1,2,4-triazole, 0.2 part of manganese naphthenate (the metal content 8%), and 1.0 part of benzoyl peroxide were mixed with stirring to give Varnish I.

EXAMPLE 3

100 Parts of the composition (I) obtained in Example 1, 0.2 part of 1,2,4-triazole, 0.2 part of manganese octoate (the metal content 8%), and 1.0 part of benzoyl peroxide were mixed with stirring to give Varnish J.

EXAMPLE 4

100 Parts of the composition (I) obtained in Example 1, 0.2 part of 3-amino-1,2,4-triazole, 0.2 part of manganese octoate (the metal content 8%), and 1.0 part of benzoyl peroxide were mixed with stirring to give Varnish K.

COMPARATIVE EXAMPLE 1

100 Parts of the composition (I) obtained in Example 1, 0.5 part of cobalt octoate (the metal content 6%), and 1.0 part of benzoyl peroxide were mixed with stirring to give Varnish A.

COMPARATIVE EXAMPLE 2

100 Parts of the composition (I) obtained in Example 1, 0.2 part of 1,2,4-triazole, 0.5 part of cobalt octoate (the metal content 6%), and 1.0 part of benzoyl peroxide were mixed with stirring to give Varnish B.

COMPARATIVE EXAMPLE 3

100 Parts of the composition (I) obtained in Example 1, 0.2 part of 3-amino-1,2,4-triazole, 0.2 part of cobalt octoate (the metal content 6%), and 1.0 part of benzoyl peroxide were mixed with stirring to give Varnish C.

COMPARATIVE EXAMPLE 4

100 Parts of the composition (I) obtained in Example 1, 0.2 part of 1,2,4-triazole, 1.0 part of lead naphthenate (the metal content 24%), and 1.0 part of benzoyl peroxide were mixed with stirring to give Varnish D.

COMPARATIVE EXAMPLE 5

100 Parts of the composition (I) obtained in Example 1, 0.2 part of 3-amino-1,2,4-triazole, 1.0 part of lead octoate (the metal content 24%), and 1.0 part of benzoyl peroxide were mixed with stirring to give Varnish E.

COMPARATIVE EXAMPLE 6

100 Parts of the composition (I) obtained in Example 1, 0.2 part of oxalic acid, 0.2 part of cobalt octoate (the metal content 6%), and 1.0 part of benzoyl peroxide were mixed with stirring to give Varnish F.

COMPARATIVE EXAMPLE 7

100 Parts of the composition (I) obtained in Example 1, 0.2 part of manganese naphthenate (the metal content 8%), and 1.0 part of benzoyl peroxide were mixed with stirring to give Varnish G.

Various properties of Varnishes A — K obtained in the above-mentioned examples are listed in Table 1.

Table 1

| Varnish | Varnish A | Varnish B | Varnish C | Varnish D | Varnish E |
|---|---|---|---|---|---|
| Compounding (part) | | | | | |
| Composition (I) | 100 | 100 | 100 | 100 | 100 |
| 1,2,4-Triazole | 0 | 0.2 | 0 | 0.2 | 0 |
| 3-Amino-1,2,4-triazole | 0 | 0 | 0.2 | 0 | 0.2 |
| Oxalic acid | 0 | 0 | 0 | 0 | 0 |
| Accelerator | 0.5 | 0.5 | 0.5 | 1.0 | 1.0 |
| (Name) | 6% Cobalt octoate | 6% Cobalt octoate | 6% Cobalt octoate | 24% Lead octoate | 24% Lead octoate |
| Curing agent (Benzoyl peroxide) | 1.0 | 1.0 | 1.0 | 1.0 | 1.0 |
| Properties | | | | | |
| Stability of | | | | | |

Table 1-continued

| | | | | | |
|---|---|---|---|---|---|
| varnish | ○ | ○ | ○ | ○ | ○ |
| Surface appearance of cured varnish | ○ | ○ | ○ | ○ | ○ |
| Degree of change of copper to green | X | ○ | ○ | ○ | ○ |
| Air drying characteristics of varnish | ○ | X | X | X | X |
| Adhesive strength under shear (kg, 25° C) | — | — | — | — | — |
| Note | Comparative Example 1 | Comparative Example 2 | Comparative Example 3 | Comparative Example 4 | Comparative Example 5 |

| | Varnish F | Varnish G | Varnish H | Varnish I | Varnish J | Varnish K |
|---|---|---|---|---|---|---|
| | 100 | 100 | 100 | 100 | 100 | 100 |
| | 0 | 0 | 0.2 | 0 | 0.02 | 0 |
| | 0 | 0 | 0 | 0.2 | 0 | 0.2 |
| | 0.2 | 0 | 0 | 0 | 0 | 0 |
| | 0.5 | 0.2 | 0.2 | 0.2 | 0.2 | 0.2 |
| | 6% Cobalt octoate | 8% Manganese naphthenate | 8% Manganese naphthenate | 8% Manganese naphthenate | 8% Manganese octoate | 8% Manganese octoate |
| | 1.0 | 1.0 | 1.0 | 1.0 | 1.0 | 1.0 |
| | X | ○ | ○ | ○ | ○ | ○ |
| | X | ○ | ○ | ○ | ○ | ○ |
| | Δ | X | ○ | ○ | ○ | ○ |
| | ○ | ○ | ○ | ○ | ○ | ○ |
| | — | 0.82 | 24.3 | 23.4 | 24.1 | 23.8 |
| | Comparative Example 6 | Comparative Example 7 | Example 1 | Example 2 | Example 3 | Example 4 |

The properties are measured as follows:

1. Stability of varnish

In a test tube having a diameter of 18 mm, a varnish is placed 7 cm in depth and allowed to stand at room temperature for 7 days. Presence of precipitate is observed. Standard of judgement: $X$ ... some precipitate, ○ ... no precipitate.

2. Surface appearance of cured varnish

A varnish is coated on a tinplate sheet (100 mm × 40 mm × 0.25 mm thick) and cured at 110° C for 1.5 hours. Surface appearance of the coating is evaluated as follows: ○ ... the coating is smooth and uniform, $X$ ... the coating has cured particles and wrinkles.

3. Degree of change of copper to green (green rust)

An apparatus as shown in FIG. 1 is used. A glass rod 1 having a diameter of 8 mm is wound loosely with a sheet of filter paper 2 and a sheet of copper 3 having a thickness of 0.25 mm, the sheet of copper being placed inside. The resulting test specimen is immersed in a varnish and then is cured at 110° C for 1.5 hours. Then, the sheet of copper and the filter paper are unwound to evaluate the degree of change of color of the filter paper to green. Standard of judgement: ○ ... no green rust is generated, and the filter paper is not changed to green, Δ ... the filter paper slightly changes to green, and $X$ ... the whole of filter paper changes to green.

4. Air drying characteristics of varnish

A varnish is coated on a tinplate sheet (100 mm × 40 mm × 0.25 mm thick) and dried at 110° C for 1 hour. Air drying characteristics of the varnish are evaluated by a touch with fingers. Standard of judgement: ○ ... the coating is not tacky, $X$ ... the coating is still tacky.

5. Adhesive strength under shear

Figure 2:
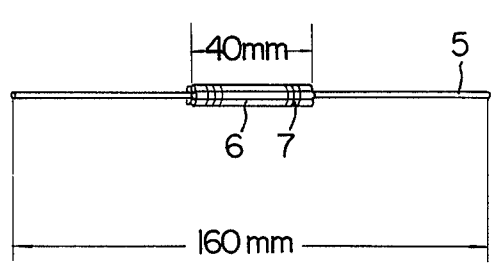
Figure 3:
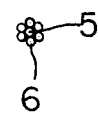

An apparatus as shown in FIGS. 2 and 3 is used. FIG. 2 is a front view of the apparatus and FIG. 3 is a cross-sectional view of the apparatus. Two naked copper wires 5 having a diameter of 2 mm and a length of 80 mm are put together and the joint part is enclosed with naked copper wires 6 having a diameter of 2 mm and a length of 40 mm so that the cross-sectional view of the joint part becomes as shown in FIG. 3. The wires are fixed softly with enameled copper wires 7. The bundle of wires is immersed in a varnish and then cured at 120° C for 3 hours. After this, the copper wires 5 are pulled oppositely to the both sides to measure adhesive strength under shear.

EXAMPLE 5

In a 500-ml four-necked flask, 84 g (1.0 mole) of 3-amino-1,2,4-triazole and 228 g (1.0 mole) of Cardura E (epoxy equivalent 245, manufactured by Shell Chemical Corp.) were placed and reacted at 150° – 160° C for 60 minutes to give viscous Additive (I).

To 100 parts of Varnish G, 0.7 part of Additive (I) was added and mixed with stirring to give Varnish L.

EXAMPLE 6

In a 300-ml four-necked flask, 84 g (1.0 mole) of 3-amino-1,2,4-triazole and 150 g (1.0 mole) of phenylglycidyl ether were placed and reacted at 120° – 130° C for 60 minutes to give viscous Additive (II).

To 100 parts of Varnish G, 0.5 part of Additive (II) was added and mixed with stirring to give Varnish M.

EXAMPLE 7

84 G (1.0 mole) of 3-amino-1,2,4-triazole and 130 g (1.0 mole) of butylglycidyl ether were reacted at 120° – 130° C for 60 minutes to give viscous Additive (III).

To 100 parts of Varnish G, 0.5 part of Additive (III) was added and mixed with stirring to give Varnish N.

Various properties of Varnishes L — N obtained in the above-mentioned examples are listed in Table 2.

Additive (I) is a mixture of compounds having the following formula:

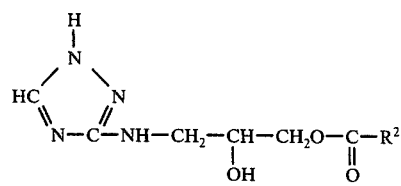

wherein $R^2$ is tertiary alkyl having 8 to 10 carbon atoms.

Additive (II) has the following formula:

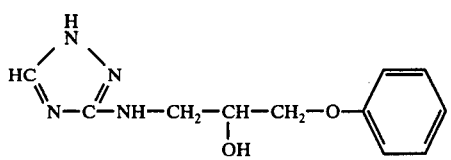

Additive (III) has the following formula:

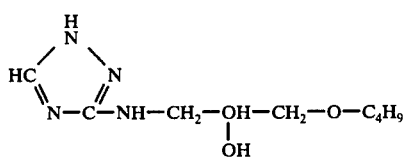

Table 2

| Varnish | Varnish L | Varnish M | Varnish N |
|---|---|---|---|
| Additive | Additive (I) | Additive (II) | Additive (III) |
| Amount (part) | 0.7 | 0.5 | 0.5 |
| Surface appearance of varnish | | | |
| Initial stage | Transparent | Transparent | Transparent |
| After 30 days at room temp. | Transparent | Transparent | Transparent |
| Patina* | Almost no | Almost no | Almost no |
| Volume resistivity* (100° C, Ω-cm) | 2.0 × 10¹³ | 1.6 × 10¹³ | 2.0 × 10¹³ |
| Note | Example 5 | Example 6 | Example 7 |

*Curing conditions: 120° C, 5 hours

As is clear from the results in Tables 1 and 2, Varnishes A and G produce patina of copper (green rust) and show poor adhesion to copper, since they do not contain 1,2,4-triazole or its derivatives. Varnishes B to E have poor air drying characteristics, since they contain metal salts (cobalt and lead) other than manganese salts of organic acids as an accelerator. Varnish F is poor in stability of varnish and surface appearance of cured varnish, since it contains oxalic acid.

On the contrary, Varnishes H to N which are within the scope of the present invention are excellent in the stability of varnish, the surface appearance of cured varnish, the degree of change of copper to green, and the air drying characteristics of varnish. Particularly, Varnishes H to K show the excellent adhesion as well as Varnishes L to N. Therefore the unsaturated polyester resinous composition of the present invention which contains at least one compound selected from the group consisting of 1,2,4-triazole and its derivatives and a manganese salt of organic acid as an accelerator is excellent in the adhesion to copper, the prevention of patina, the air drying characteristics and the stability of varnish.

What is claimed is:

1. An unsaturated polyester resinous composition comprising (a) unsaturated polyester, (b) at least one crosslinkable monomer, (c) at least one compound selected from the group consisting of 1,2,4-triazole and its derivatives, (d) a curing agent and (e) a manganese salt of an organic acid, wherein the proportion of the unsaturated polyester (a) is 80 – 30% by weight, the proportion of the crosslinkable monomer (b) is 20 – 70% by weight, and 0.000012 – 0.036 mole of the compound (c), 0.5 – 3.0 g of the curing agent (d) and 0.001 – 1.5 g of the manganese salt (e) are present based on 100 g of the total of the components (a) and (b), and wherein 1,2,4-triazole and its derivatives in the compound (c) have the formula:

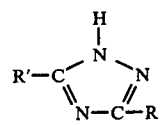

wherein R and R' are independently hydrogen, amino or a group of the formula,

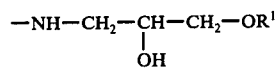

or

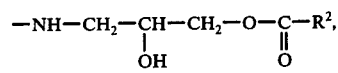

wherein R¹ is alkyl having 4 to 8 carbon atoms, phenyl, halogen substituted phenyl, cresyl, or halogen substituted cresyl; and R² is alkyl having 8 to 10 carbon atoms.

2. A composition according to claim 1, wherein the proportion of the component (a) is 70 – 50% by weight and the proportion of the component (b) is 30 – 50% by weight, and 0.00012 – 0.024 mole of the component (c), 1.0 – 2.0 g of the component (d) and 0.005 – 0.05 g of the component (e) are present based on 100 g of the total of the components (a) and (b).

3. A composition according to claim 1, wherein 1,2,4-triazole and its derivatives in the component (c) are 1,2,4-triazole, 3-amino-1,2,4-triazole, 5-amino-1,2,4-triazole, 3,5-diamino-1,2,4-triazole and a compound of the formula,

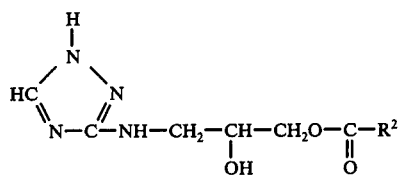

wherein R² is tertiary alkyl having 8 to 10 carbon atoms, and

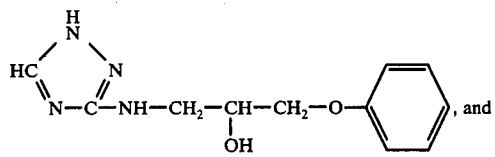, and

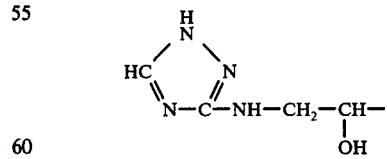

4. A composition according to claim 1, wherein the manganese salt of organic acid is manganese naphthenate or manganese octoate.

5. A composition according to claim 1, wherein 1,2,4-triazole and its derivatives in the component (c) are 1,2,4-triazole and 3-amino-1,2,4-triazole.

* * * * *